(12) United States Patent
Zhang

(10) Patent No.: US 9,021,804 B2
(45) Date of Patent: May 5, 2015

(54) SELF-SUSTAINING LOW PRESSURE EGR AND EXHAUST SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 13/804,554

(22) Filed: Mar. 14, 2013

(65) Prior Publication Data

US 2014/0260243 A1 Sep. 18, 2014

(51) Int. Cl.
*F02B 33/44* (2006.01)
*F02B 27/04* (2006.01)
*F01N 3/10* (2006.01)
*F02M 25/07* (2006.01)

(52) U.S. Cl.
CPC ....... *F02M 25/0709* (2013.01); *F02M 25/0712* (2013.01); *F02M 25/0726* (2013.01); *Y02T 10/121* (2013.01)

(58) Field of Classification Search
USPC ................. 60/605.2, 272, 323, 302; 180/309; 138/177, 178, 163; 181/227
See application file for complete search history.

(56) References Cited

U.S. PATENT DOCUMENTS

| | | | | |
|---|---|---|---|---|
| 3,889,772 A * | 6/1975 | Kelley | ............. | 138/178 |
| 4,884,399 A * | 12/1989 | Morris | ............. | 180/309 |
| 4,926,634 A * | 5/1990 | Putz et al. | ............. | 60/274 |
| 5,144,799 A * | 9/1992 | Barth | ............. | 60/323 |
| 5,220,789 A * | 6/1993 | Riley et al. | ............. | 60/302 |
| 5,327,722 A * | 7/1994 | Clegg et al. | ............. | 60/323 |
| 6,141,958 A * | 11/2000 | Voss | ............. | 60/272 |
| 6,644,437 B1 * | 11/2003 | Hayman | ............. | 181/268 |
| 6,662,900 B2 * | 12/2003 | Cathcart et al. | ............. | 181/240 |
| 7,637,349 B2 * | 12/2009 | Harada | ............. | 181/227 |
| 7,836,693 B2 | 11/2010 | Fujita et al. | | |
| 7,926,272 B2 | 4/2011 | Takemoto | | |
| 7,942,235 B2 * | 5/2011 | Mirlach et al. | ............. | 181/227 |
| 2011/0265473 A1 * | 11/2011 | Karim et al. | ............. | 60/605.2 |

FOREIGN PATENT DOCUMENTS

| | | |
|---|---|---|
| EP | 2270327 A2 | 6/2010 |
| EP | 2397677 A1 | 5/2011 |
| WO | 2011137349 A1 | 11/2011 |

* cited by examiner

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP

(57) ABSTRACT

An exhaust system, comprising a LP-EGR system that couples an exhaust system to an intake system and an exhaust pipe within the exhaust system with a turn greater 90 degrees and less than 270 degrees between front and rear tires and upstream of a LP-EGR exhaust inlet; and a muffler positioned in the exhaust system downstream of the LP-EGR exhaust inlet and forward of the front tires. By shortening the LP-EGR path, back pressure to sustain EGR flow can be maintained without the use of a back pressure valve.

19 Claims, 4 Drawing Sheets

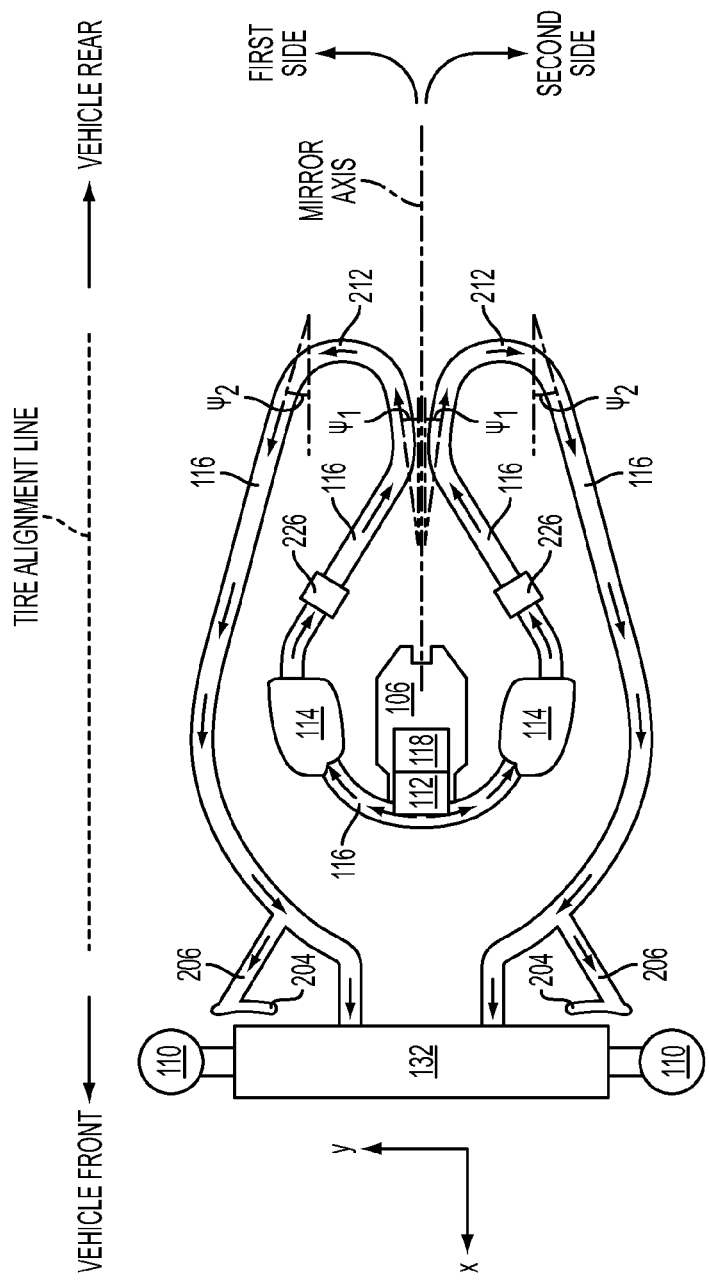
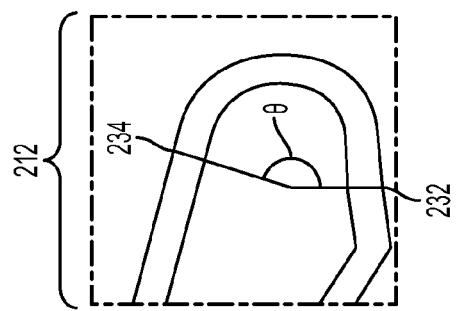
FIG. 3
FIG. 2B

SELF-SUSTAINING LOW PRESSURE EGR AND EXHAUST SYSTEM

BACKGROUND AND SUMMARY

Exhaust gas recirculation (EGR) may be used to increase an engine's fuel efficiency and reduce emissions. This is achieved by recirculating exhaust gas into the intake manifold for combination with ambient air before delivery to the combustion chamber. In systems utilizing a turbocharger, exhaust gas can be recirculated via a high-pressure system (HP-EGR) or a low-pressure system (LP-HGR). In HP-EGR systems the exhaust may have an outlet upstream of a turbine and an intake downstream of the compressor. HP-EGR systems allow a steady stream of gas in enter the intake system due to a higher pressure differential between the exhaust system and the intake manifold during non-boosted conditions; however, exhaust soot can accumulate or un-burned fuel can condense within the EGR or intake system causing engine degradation. LP-EGR systems couple an exhaust outlet downstream of a turbine to an inlet upstream of a compressor. By this method, exhaust gas can be purified by a particulate or other emission control system prior to recirculation into the intake system, lessening the soot content and the resulting build up within the engine system. However, in LP-EGR systems, exhaust gas traverses a substantial length of the vehicle before recirculating into the intake system, contributing to a number of problems within the EGR system.

During some conditions, pressure within an intake (MAP) is lower than pressure within the exhaust system. Intake compressors, exhaust turbines, and exhaust mufflers may each contribute to the pressure differential between the systems. However, pressure losses increase with increased LP-EGR length and in some long path LP-EGR systems, EGR flow cannot be maintained via the inherent pressure differential within the system. Back pressure valves may be incorporated into LP-EGR systems to create a sufficient pressure differential between the intake and exhaust system. However, the degradation of the additional valve component can disable the entire LP-EGR system. Further, resonance within the EGR system and intake resulting from this back pressure valve can create auditory disturbances for the driver and vibrations within the EGR that can lead to mechanical failures.

Increased EGR path length also causes increased feedback delays so that systems regulating recirculation in response to a current engine load may experience precision losses. Further, increased path length of the LP-EGR pipe increases production cost and vehicle weight and consumes limited under-carriage space.

The inventors, having recognized the above issues, provide various LP-EGR systems using a shorter EGR path, reducing the reliance on a back-pressure valve. In one example, the engine may be configured so that an exhaust pipe, with an initial flow direction towards the rear of the vehicle, turns so that it redirects gas towards the front of the vehicle. By introducing this turn in the exhaust pipe, exhaust gas is routed back toward the front of the vehicle where the intake system is located, relocating the turbine and tailpipes from the back of the vehicle to the front of the vehicle nearer the compressor.

The disclosed arrangement shortens the length of the EGR pipe, thus reducing pressure losses to such an extent that sufficient pressure can be generated by the muffler to sustain recirculation. The forward disposed exhaust system also lessens the weight of the vehicle by removing an excessively long EGR pipe and lessens the response time of recirculation for systems that meter recirculation in response to operating conditions or load considerations. Further, by placing the tail pipe in the front of the vehicle, heated exhaust gas may be directed toward the ground and may transfer heat to ice or snow present on the road prior to contact with the tires thus increasing tire traction of front tires and improving drivability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2B shows an enlarged portion of FIG. 2A.

FIG. 3 shows the disclosed embodiment of the LP-EGR system as indicated in FIG. 2A.

DETAILED DESCRIPTION

Figure 1:
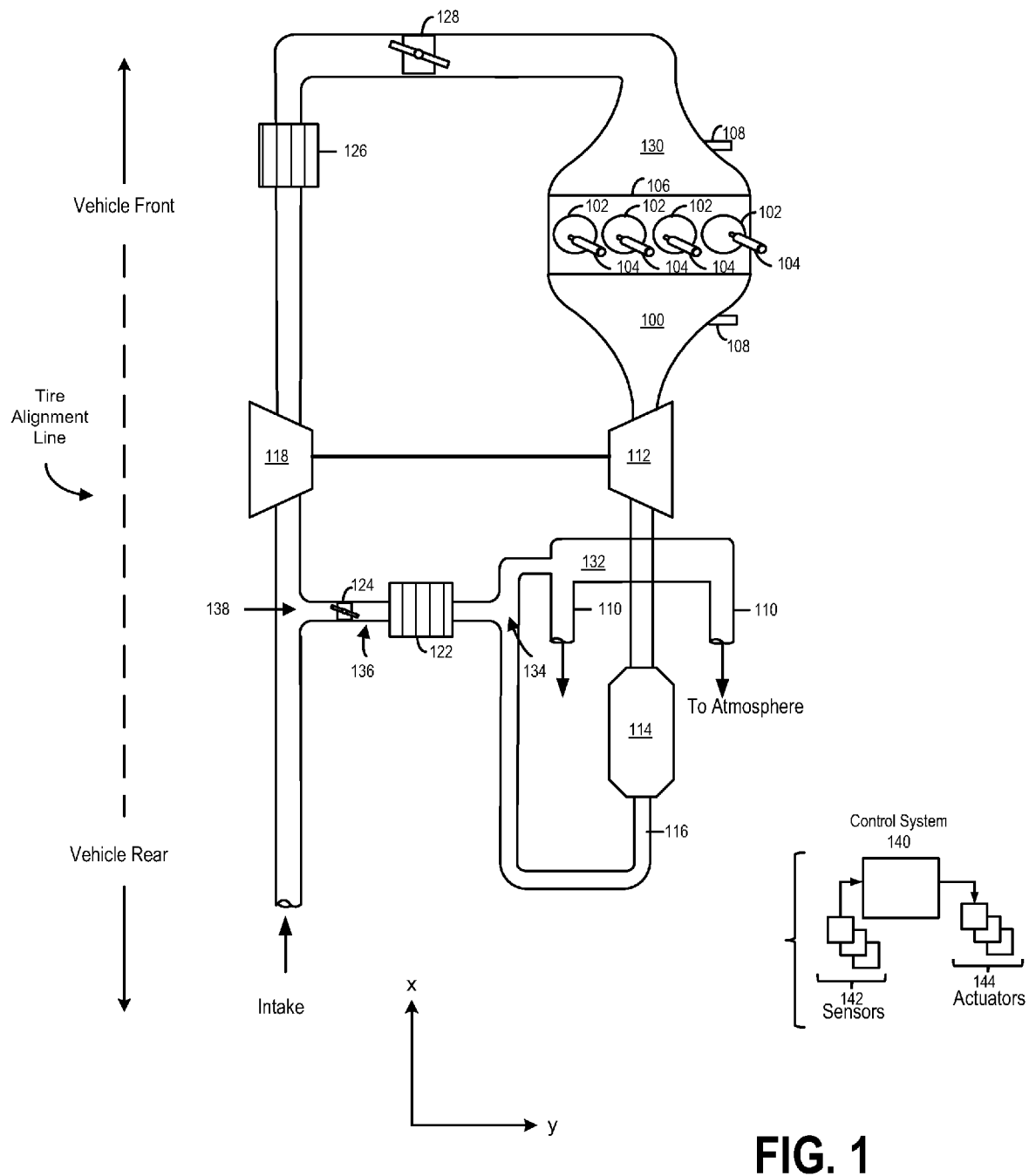
FIG. 1 schematically depicts an embodiment of the disclosed LP-EGR system.

The following details systems and methods for an LP-EGR system of an engine equipped with a turbo charger. LP-EGR generally refers to an EGR system with an exhaust gas outlet located in a negative pressure portion of the intake system, such as upstream of a compressor and an exhaust gas inlet located in a positive pressure portion of an exhaust system, such as the downstream side of a particulate filter, catalytic converter, or other emission control device that is coupled in the exhaust system. In contrast, an HP-EGR system generally refers to an EGR system with an exhaust gas outlet located in a higher pressure portion of the intake system than a LP-EGR and an exhaust gas inlet located in a higher pressure portion of the exhaust system than the LP-EGR upstream of a turbine.

The disclosed LP-EGR systems may include a number of devices along a recirculation pathway. The EGR system may have one or more heat exchangers within the exhaust recirculation path. A heat exchanger may be an EGR cooler and may expose EGR gas to a cooling liquid via a thermally conductive separator. Cooling EGR gas may occur in response to an engine's operating conditions and may help to maintain gas at a desired temperature. Cooling EGR also reduces the volume of an amount of exhaust gas and thus allows a greater mass of fuel to be delivered for a given volume of EGR. Cooling may also be initiated in response to the density of fuel within the exhaust gas so as to not surpass an emission threshold for a certain operating condition.

Bypasses may be present within the disclosed LP-EGR system to bypass one or more EGR coolers in order to achieve ideal operating temperature within the engine or to manage condensate within the intake system. One or more throttles may also be present within the EGR system to manage the amount of EGR to be recirculated into the intake system. Throttles may be located at an outlet, inlet, or along EGR passages. EGR gas may be further throttled within the intake system after recirculation and prior to combustion. The throttle may meter the amount of exhaust gas and intake air available for combustion.

In a supercharged system that does not utilize a turbine, or a dual-charged system that includes a turbine as well as engine powered compression, the LP-EGR exhaust gas inlet may be located downstream of an emission control device such as filter or catalytic converter and/or a turbine.

The disclosed LP-EGR may be used in combination with a HP-EGR system or independently. Systems equipped with both LP-EGR and HP-EGR may decouple one of the two systems from the intake in response to certain load or operating conditions. Other embodiments may allow the two systems to operate congruently and a control system may regulate the exhaust flow through each respective system in response to operating conditions.

The disclosed LP-EGR system may also include a plurality of exhaust outlets that may be valved independently and may be disposed on a plurality of inlets upstream and/or downstream of an intake cooler, throttle or compressor. The LP-EGR system may also have a single exhaust outlet that branches into a plurality of LP-EGR pipes that may be disposed in a plurality of places upstream and/or downstream of a cooler, throttle, or compressor. In a branch LP-EGR system, the branching may occur downstream of a throttle so that the exhaust gas through the pipes is metered by a single actuator, it may also be independently actuated.

Figure 2A:
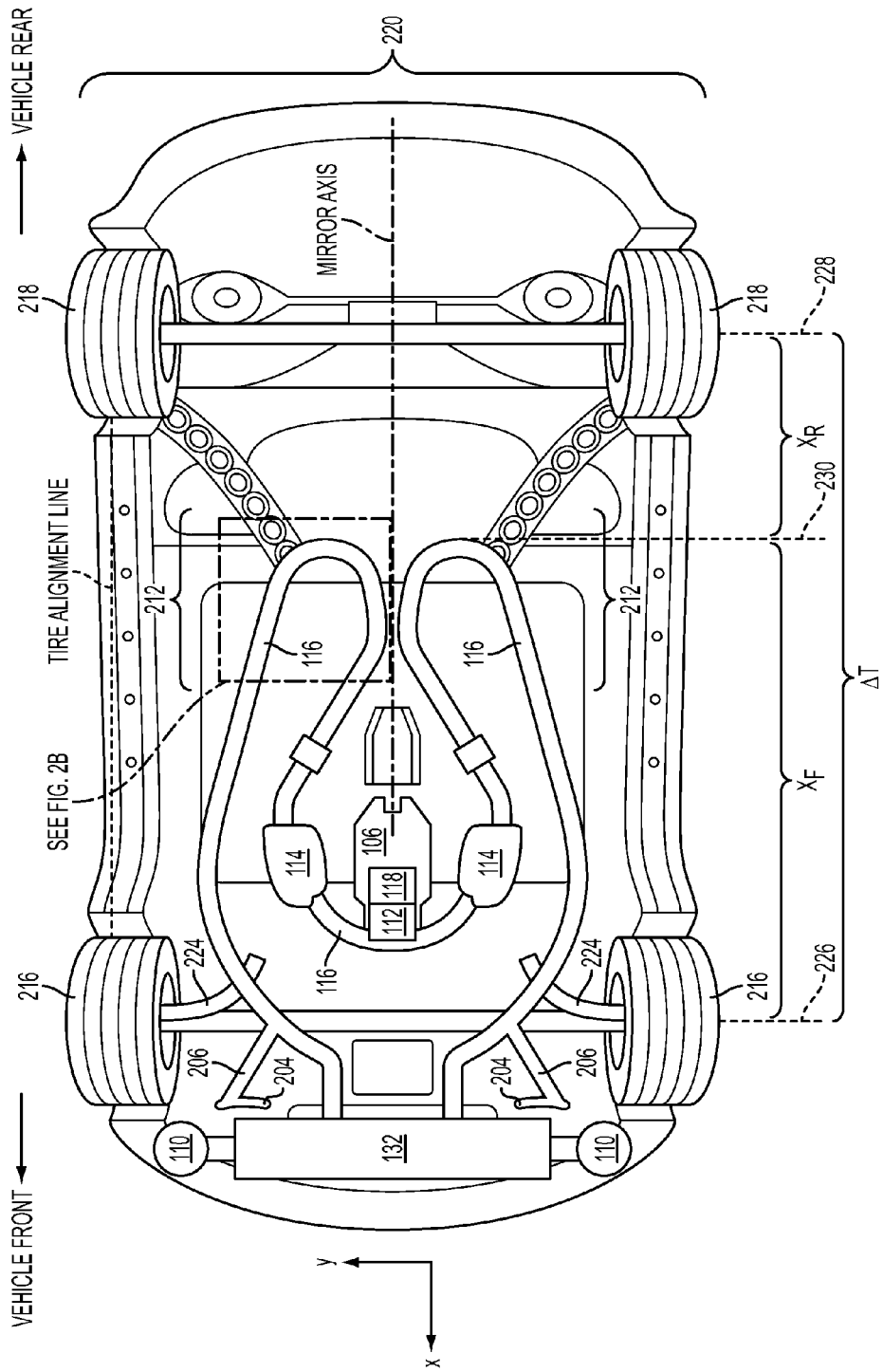
FIG. 2A shows the underside of a vehicle with an embodiment of the disclosed LP-EGR system. The figure is dawn approximately to scale, although other relative dimensions may be used.
Figure 4:
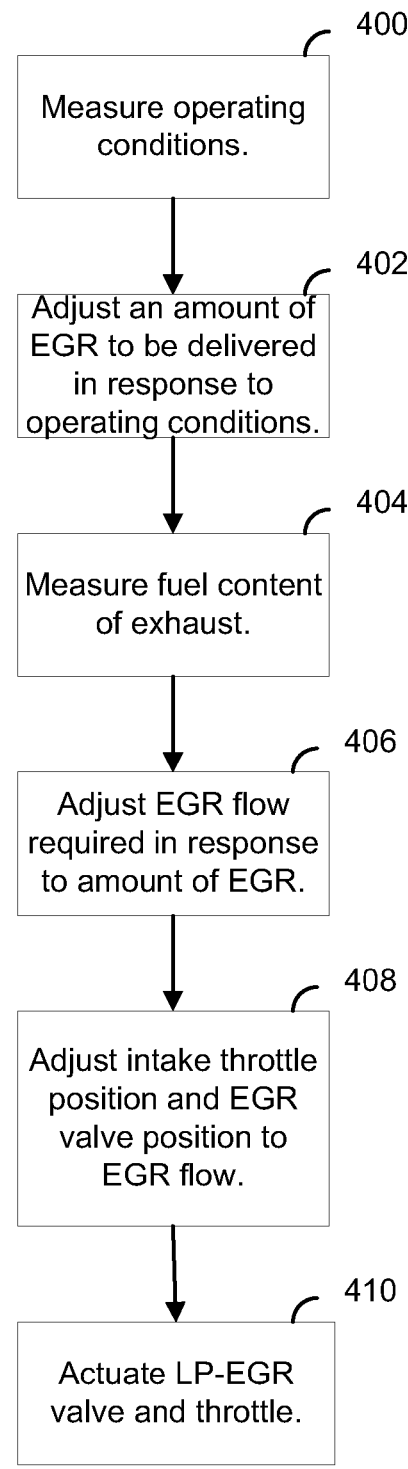
FIG. 4 shows an example control routine for the disclosed LP-EGR system.

FIG. 1 schematically depicts a sample turbocharged engine, intake system, and exhaust system equipped with LP-EGR. FIG. 2A shows an example underbody arrangement including a partial intake system, exhaust system, and LP-EGR system as viewed from the underside of the vehicle. FIG. 2B shows an enlarged portion of exhaust pipe of FIG. 2A. FIG. 3 further details the LP-EGR system of FIG. 2A removed from the underbody of the vehicle. FIG. 4 shows an example operating routine for the LP-EGR system disclosed herein.

Turning now to FIG. 1, the system depicted is compatible with a 4-cylinder inline engine of a vehicle. The engine 106 has combustion chambers 102 configured to receive aircharge from intake manifold 130. Within the combustion chambers air may be mixed with fuel from fuel injectors 104 prior to ignition and combustion either by spark or compression ignition methods. The combustion referred to herein may be partial combustion wherein a portion of the fuel within the cylinders oxidized and a portion remains unoxidized and chemically unchanged and may thus be used for subsequent combustions. Exhaust gas exiting the cylinder following combustion includes a mixture of both the oxidized fuel and the unoxadized fuel.

Engine 106 may be a boosted via a turbocharging system including a turbine 112 that provides power to a compressor 118. Exhaust gas may be translated into kinetic energy to actuate turbine 112 and experience a pressure drop across the turbine 112. The turbine may be coupled to one or more emission control devices that may include a particulate filter, SCR catalyst, three-way catalyst, lean NOx trap or an oxidation catalyst. An exhaust pipe 116 located downstream of emission control device 114 may include a LP-EGR exhaust gas outlet upstream of a muffler 132.

Muffler 132 may function to reduce the amplitude of the sound pressure created by the engine prior to its exhaust into the atmosphere via tailpipes 110. Sound pressure volume reduction may be achieved by introducing destructing interference by way of insulated passages and chambers within the muffler tuned to resonate at destructive frequencies. By obstructing the exit passage of exhaust gas, muffler 132 may create a back pressure into exhaust pipe 116 and coupled exhaust gas outlet 134. If back pressure is sufficiently high, exhaust gas will be forced through exhaust gas outlet 134, into LP-EGR pipe 136.

Note that the negative x-direction points toward the rear of the vehicle and the positive x-direction points towards the front of the vehicle as shown in FIG. 1. In some EGR systems, the exhaust pipe 116 continues in the negative x-direction of emission control device 114 so that muffler 132 is placed in the negative x-direction with respect to the emission control device 114. Tailpipes 110 exit muffler 132 and exhaust gas toward the rear of the vehicle. In this arrangement, LP-EGR exhaust outlet is located in the negative x-direction with respect to the emission control device 114 so that it is between the emission control device 114 and the muffler 132, requiring the LP-EGR pipe to traverse a substantial length of the vehicle. In this arrangement, the LP-EGR pipe turns direction by 180 degrees so that it may be coupled to the intake system located in the positive x-direction with respect to the filter. EGR flow from the exhaust system to the intake system may be sustained by a pressure differential between an outlet port and an inlet port. The pressure differential for EGR flow sustenance increases with the length of the EGR pipe as well as any directional changes and is substantially increased by the 180 degree directional turn of exhaust gas flow in traditional EGR systems. In some systems, mufflers alone cannot provide sufficient back pressure to sustain EGR flow thus additional back pressure is generated. Additional back pressure is commonly achieved by the implementation of a back pressure valve.

However, back pressure valves create an additional manufacturing cost and introduce additional potential for mechanical failures. Further, the increased pressure created by the valves introduces additional strain the EGR pipe and EGR valve as well as increased back pressure on the engine and turbine of turbocharged systems. Increased back pressure can cause engine degradation and decreased fuel efficiency, it may also reduce the efficiency of the turbine and therefore the turbochargers effectiveness.

In the disclosed system, the exhaust pipe 116 has a directional turn upstream of the exhaust gas outlet 134 and muffler 132. This turn is achieved by bending in the exhaust pipe downstream of the exhaust manifold and upstream of the EGR take-off. In FIG. 1 this turn is located downstream of emission control device 114 and turbine 112. In alternative embodiments it may be upstream or downstream of either or both the turbine 112 and emission control device 114.

The turn angle is indicated by theta (A) in the enlarged view box in FIG. 2B with turn at turning point 212. The turn may occur at a turning point 212 that is on a turning point line 230 and may refer to the point within the exhaust pipe that is nearest the rear tires 218 and/or furthest from the engine 106, intake, LP-EGR pipe 206, muffler 132, or front tires 216. The turn angle may be measured from a first point 232 at which a first line of the angle intersects the diameter of the exhaust pipe 116 perpendicularly; and a second point 234 at which a second line intersects the diameter of the exhaust pipe perpendicularly. The angle θ may be an angle between the first line and the second line which may both be in the x-y plane. The x-y plane may be parallel to the underbody 220 and may be referred to as the underbody plane; it may be further parallel to the four tire-to-road contact points of the front and rear tires. The first point 232 may be upstream of a turning point 212 and a second point 234 may be located downstream of a turning point 212. The first point 232 may be downstream of an emission control device 114 and engine 106. The second point 234 may be downstream of the first point 232 and may be upstream of a muffler 132 and LP-EGR pipe 206.

The angle θ may be greater than 90 degrees and less than 270 when measured in the plane of the first and second line. Note that in one example, the turn may be a 180 degree turn. By including an exhaust pipe turn between 90 degrees and 270 degrees, an exhaust pipe may run along a path from the front of the vehicle toward the rear of the vehicle and, after a turning point 212, the exhaust pipe may bend about an angle to that it runs along a path toward the front of the vehicle.

In one example, the path of the exhaust pipe in the x-y plane may be understood to be a sinuous path with one or more curves as a function of the position along the x-axis. A tailpipe of the exhaust pipe may be nearer the engine and/or front of the vehicle than a mid-point and/or the turning point of the exhaust pipe 116. The location of the intake may be nearer the engine and/or the front of the vehicle than the rear of the vehicle and/or the turning point. Consequently, the turn within the exhaust pipe places the exhaust pipe in closer proximity to the intake. LP-EGR paths connect a lower pressure portion of the intake to a higher pressure portion of the exhaust, thus the disclosed system allows for a shortened LP-EGR path and more easily maintained pressure differential.

Alternate embodiments may not include a turbocharger. In these embodiments, the EGR inlet may be located in a lower pressure portion of the exhaust system upstream of the directional turn.

A turn may also be included into an emission control device or turbine such that the flow direction of exhaust gas at the inlet of the filter or turbine may be opposite the flow direction of exhaust gas at the outlet of the emission control device or turbine with respect to the x-y plane. In other words, the directional change may be incorporated into the geometry of the turbine or filter and the coupling pipe may be straight or nearly straight in disclosed embodiments.

The change in flow direction allows the exhaust gas outlet 134 to be located in the positive x-direction with respect to the turbine and/or filter so that it is in closer proximity to the intake system located near the front of the vehicle and exhaust gas is directed toward the front of the vehicle. The muffler may then be placed near the front of the vehicle so that the exhaust gas that is not recirculated may exit through tailpipes 110 located near the front of the vehicle. The disclosed embodiment allows for a shorter LP-EGR pipe 136 and eliminates or substantially reduces the EGR pipe flow direction change as compared to more traditional methods. The shortened EGR pipe lowers the back-pressure demand to sustain the flow of exhaust gas through the EGR system so that the back pressure valve may be eliminated and sufficient pressure may be provided by the muffler alone.

Nevertheless, some disclosed embodiments may include a back pressure valve to achieve heightened pressure for increased flow. Further, by increasing the length of the exhaust system and including the flow direction change, the back pressure transmitted by the muffler or additional back pressure valve to the emission control device, turbine, and engine may be decreased thus decreasing efficiency losses and degradation. In other words, the increased pressure losses that might otherwise hinder LP-EGR are transferred to the exhaust system and advantageously implemented to protect the turbine and engine system from back pressure.

LP-EGR pipe 136 may be coupled to an exhaust cooler 122 and may include cooler bypass passages (not shown) valved by control system 140 in response to intake or engine conditions that may include temperature and humidity. LP-EGR valve 124 may be communicatively coupled to control system 140 to regulate the passage of exhaust gas through the LP-EGR system, this may be in response to the unoxidized fuel content within exhaust gas as well as engine load demands. The passage of exhaust gas through the LP-EGR system may also be deactivated in response to intake system conditions such as temperature or intake pressure.

The amount of unoxidized fuel remaining in exhaust from a single combustion may be influenced by several factors. One substantial factor may be the presiding engine load demands and resulting air injected into the combustion chambers for ignition. If the engine load demands are low, the amount of air delivered to the system may be lower, increasing the amount of unoxidized fuel remaining after combustion. Engine temperature may also affect the amount of fuel escaping combustion because lower engine temperatures have lower combustion efficiency.

Charge motion control valves may be incorporated into the system to increase combustion efficiency. These factors, as well as other operating conditions not otherwise specified herein, may be communicated to a control system by sensors 160. These sensors may measure, for example, oxygen content, and humidity, temperature within the intake and/or exhaust system. Sensors may also measure engine load, engine temperature, or throttle position. Example sensors may be manifold pressure sensors 108. Valve actuation may be controlled by control system 140 via communicatively coupled actuators 144.

Exhaust gas passing through valve 124 may enter exhaust gas inlet 138 where it may combine with intake air from the atmosphere that has been compressed by compressor 118. In the embodiment shown, exhaust gas inlet 138 draws exhaust gas for the exhaust system upstream compressor 118. In other embodiments, the inlet may be located downstream of compressor 118. Further, the LP-EGR system may branch into two pipes, one with an inlet upstream of the compressor 118 and the other with an inlet downstream of the compressor 118. Each branch may contain a cooler or may branch downstream of a cooler, the branches may also be regulated by separate valves or may branch downstream of a single LP-EGR valve.

The combined ambient air and exhaust gas may then pass through an intake air cooler 126. In other embodiments, the intake air cooler may be located upstream the exhaust gas inlet such that exhaust gas does not traverse the intake cooler.

A throttle 128 may be communicatively coupled to control system 140 and may be actuated in response to engine load demands allowing a higher mass of air into the intake manifold for higher load demands and a lower mass of air into the intake manifold in response to low load demands. Throttle actuation may be responsive to the amount of exhaust gas recirculated into the engine system. The throttle may be coupled to intake manifold 130 and may be located upstream of the engine combustion chambers 102.

During the filling portion of a power stroke, combustion chambers may be filled with the exhaust gas and ambient air combination for combustion. The exhaust gas and/or ambient air delivered into the combustion chambers may be injected with additional fuel prior to fill; it may also be injected or combined with fuel within the combustion chamber.

Engine 106 and intake manifold 130 may be located in the positive x-direction of the turbine 112, and/or emission control device 114. The aircharge intake from the atmosphere may be located in the positive x-direction with respect to engine 106, turbine 112, and emission control device 114. The LP-EGR exhaust gas inlet and/or exhaust gas outlet may be located in the positive x-direction of the turbine 112 and/or emission control device 114; alternately, they may be located in the negative x-direction with respect to the muffler 132.

Turning now to FIG. 2A, a vehicle underbody 220 with the LP-EGR system disclosed herein, such as that illustrated in FIG. 1, is depicted. The vehicle underbody 220 includes a multi-cylinder V-shaped engine and thus may have an exhaust system and intake system for each inline bank of cylinders. The first side of the exhaust system (in the positive y-direction) may mirror the second side of the exhaust system (in the negative y-direction) where the mirror axis is the axis parallel to the x-axis from the center front of the vehicle to the center rear of the vehicle as indicated in the figure. In alternate embodiments, the engine may have an inline configuration wherein the combustion chambers are linearly aligned on a single axis. Inline engines may have one exhaust pipe and/or one EGR passage.

Engine 106 may be coupled to exhaust pipe 116, and exhaust pipe 116 may be further coupled to an emission control device 114. The direction of exhaust flow may have an initial x-component toward the rear of the vehicle. Near a mid-section of the vehicle, the exhaust pipe may curve at turning point 212 toward the outside of the vehicle (away from the mirror axis) until it has an eventual flow direction with an x-component toward the front of the vehicle. The mid-section of the vehicle may be defined as the section of the vehicle between the front tires 216 and rear tires 218. Flow path continues toward the front of the vehicle toward a forward muffler placed near, and aligned parallel to, the front bumper. In this embodiment, LP-EGR pipe 206 may be upstream of the muffler. Pipe 206 may be coupled to the partial intake pipe 204 for exhaust recirculation into the intake system.

The two front tires 216 may each have a contact point with the road that is aligned along an axis indicated by front tire line 226. The tires may be actuated by tie rod 224. Similarly, the two rear tires 218 may each have a contact point with the road that is aligned along an axis indicated by rear tire line 228. Front tire line 226 and rear tire line 228 may be parallel and separated by distance ΔT; they may also be parallel to the y-axis. The turning point 212 of the exhaust pipe 116 may be between front tire line 226 and rear tire line 228 along a turning point line 230 parallel to the front tire line 226 and the back tire line 228, and each may be orthogonal to a mirror axis. The turning point line 230 and the front tire line 226 may be separated by a distance $X_F$. The turning point line 230 and the rear tire line 228 may be separated by a rear separation distance $X_R$ such that the sum of $X_F$ and $X_R$ equals ΔT. In some embodiments, $X_F$ may be equal to $X_R$ such that the turning point is equidistance from the front tire line 226 and the back tire line 228. Engine 106 may be between front tire line 226 and turning point line 230. An emission control device 114, additional resonators (not shown), and/or tie rod 224 may also be between front tire line 226 and turning point line 230.

The location of a turbine, cooler, particulate filters, or other devices that may be coupled to the exhaust system are not indicated within FIG. 2A and may be located at various points along the path of pipe 208. Specifically, a turbine may be located upstream of a filter, or both may be located upstream of the turning point 212. Alternately, the turbine may be located upstream of turning point 212 and the filter located downstream of turning point 212. An exhaust gas cooler may be located along the EGR pipe 206 and may further include a cooler bypass. The exhaust system may further include a valve to meter LP-EGR flow that may be located within pipe 206 upstream or downstream of an optional cooler.

Exhaust gas not recirculated through an EGR system may pass through the muffler 214 before being exhausted through tailpipes 110. Tailpipe 110 may be located in front of the vehicles front tires; additionally or alternately, it may also be positioned to exhaust gas in a downward direction (toward the road). The disclosed arrangement may allow exhaust gas to interact with the road surface prior to the surface coming into contact with the wheels. Heat from the exhaust gas may be transferred to ice or snow on the surface of the road and may melt or help to melt the ice or snow improving vehicle traction and drivability.

A compressor and/or intake air cooler may be located upstream or downstream of the intake pipe 204. Further, an intake air cooler may be located downstream of partial intake pipe 204 and a compressor located upstream of partial intake pipe 204. An intake throttle may be located downstream or upstream of the partial intake pipe 204. Other embodiments may include a plurality of throttles wherein at least one throttle is located upstream of the exhaust gas inlet and at least one other throttle is located downstream of the exhaust gas inlet so that the first throttle controls the amount of fresh air delivered to the intake system and a second throttle determines the amount of fresh air-exhaust gas mixture delivered to the intake manifold.

The intake and exhaust system of FIG. 2A is further detailed in FIG. 3. In FIG. 3 the flow direction of exhaust gas is indicated by arrows. As shown, flow direction may be the net direction of exhaust gas flow at a given position in the EGR passage. Flow direction may be represented by a three dimensional vector, though it should be noted that the x and y components of flow direction are discussed herein therefore embodiments may have additional flow direction z-components not otherwise specified. The x and y components of flow direction can be described as functions of a two dimensional angle ψ that may be measured from the flow direction vector to the nearest x-axis (within 90 degrees) as indicated in the figure.

The magnitude of the x-component is equal to the magnitude of the cosine of ψ. Further the x-component is positive if it points towards the front of the vehicle and negative if it points toward the rear of the vehicle. Similarly, the magnitude of the y-component is equal to the magnitude of the sine of ψ. Further the y-component is positive if it points towards a first side of the vehicle and negative if it points toward a second side the vehicle. The first side of the vehicle may be understood to be the left side of the vehicle with respect to a driver within the vehicle. The second side of the vehicle may be understood to the right side of the vehicle with respect to the driver within the vehicle. In some embodiments the x-axis may be may be orthogonal to the y-axis.

In this embodiment, exhaust gas leaving the engine 106 may split into two opposite flow directions at the outlet of the exhaust manifold 100. In the first side of the exhaust system of this embodiment, a first flow direction may have a positive y-component, it may also have a zero or nearly zero x-component. Upstream of an emission control device 114, the x-component of flow direction may become more negative. Flow direction may then have a y-component equal to zero upstream, downstream, or within the emission control device 114 such that the x and y component of flow direction are both negative.

Flow direction may then change and experience a turn downstream of the engine such that the x-component and y-component of flow direction is in the positive direction. In some embodiments, one or more emission control devices may be on the downstream side of this turn. Exhaust flow direction may then continue to have a positive x-component. Flow direction may be entirely positive in the y-direction or, as shown, it may be positive before becoming negative downstream of the exhaust intake of muffler 132. A LP-EGR path may branch from exhaust pipe 116 at a point downstream of turning point 212 and upstream of muffler 132. The LP-EGR path may have a flow direction with a positive x and y component and may then combine with intake air within LP-EGR pipe 136 at exhaust gas outlet 134.

In an embodiment compatible with a V-shaped configuration, the exhaust system may have sides corresponding to the two inline banks of the engine of the engine. The first side is explained above. The second side of the exhaust system may be within the second side of the vehicle and may have flow direction components mirrored across a mirror axis that may be parallel to the x-vector and equidistant from the two front wheels. In other words, this embodiment may have an additional set of the aforementioned additional exhaust system devices downstream of the engine 106 and upstream of the muffler 132 on the second side. The flow direction of the exhaust system and LP-EGR system may thus have the same x-components with respect to these aforementioned devices as the exhaust system in the first half. However, the flow direction in the second side may have y-components that are opposite with respect to the aforementioned devices (negative to positive and positive to negative) to the y-components of flow direction of the first side. Similarly, the second side of the exhaust system may branch into an LP-EGR path that has a flow direction with a positive x-component and negative y-component.

In the embodiment depicted, the first side of the exhaust system may be disposed on a first exhaust intake of muffler 132 and the second side of the exhaust system may be disposed on a second exhaust intake of muffler 132. In alternate embodiments, the first side of the exhaust system may combine with the second side of the exhaust system upstream of an exhaust inlet of muffler 132. Downstream of muffler 132, exhaust gas may exit the system via tailpipes 110.

The flow direction change at the turning point of the exhaust system within the exhaust pipe may further allow the LP-EGR pipe to have exhaust outlet near the front of the vehicle so that it travels a small fraction of the length of the car before inlet into the intake system. Further, the disclosed embodiment allows for the LP-EGR pipe to be linear or nearly linear, eliminating or reducing pressure losses within the EGR system.

LP-EGR valves may be regulated by a control system in response to operating conditions and engine load demands. The shortened distance from the EGR exhaust outlet to the exhaust inlet of the disclosed system lessens the time elapsed during recirculation thus lessening the delay between valve actuation and exhaust arrival to the intake system. The increased responsiveness of the system increases the control precision of the EGR valve by the control system.

In one example, the exhaust pipe may be positioned to direct exhaust from a turbine outlet toward a rear of the vehicle and toward a central axis of the vehicle in the x-y plane. Then, the exhaust pipe may direct the exhaust away from the central axis and turn the flow direction back toward a front of the vehicle, passing by the engine exhaust and turbine, before reaching a muffler.

Now turning to FIG. 4, an example routine is shown for operating a LP-EGR valve to provide a desired amount of exhaust gas to the intake system. The desired amount of exhaust gas may be a determined percent of dilution of exhaust gas with fresh air to achieve desired torque for an intake throttle position.

At 400, engine operating conditions may be estimated and/or measured. These may include, for example, engine speed, driver-requested torque, engine coolant temperature, catalyst temperature, VCT, MAP, BP, and/or MAT. At 402, an amount of EGR gas into the intake system may be adjusted to achieve an engine torque and may be responsive to engine operating conditions. The adjustment may include determining a desired EGR percent dilution in response to speed, load, engine temperature, and other engine operating conditions. At 404, the unoxidized fuel content of the exhaust gas may be adjusted in response to the above conditions. At 406, the flow of EGR may be adjusted to achieve a desired dilution of air to fuel.

At 408, a position of the air intake throttle and the EGR valve may be adjusted in response to an air flow, unoxidized fuel content, and engine operating conditions, such as air temperature, BP, estimated EGR temperature and post-EGR cooler pressure. At 410, the intake throttle and EGR valve may be actuated to the desired positions allowing the exhaust gas and intake air to combine.

Note that the example control and estimation routines included herein can be used with various engine and/or vehicle system configurations. Further, this technology can be applied to any type of powertrain including, but not limited to, powertrains associated with pure electric, hybrid electric, plug-in hybrid electric, fuel cell electric, and diesel engine powered vehicles. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of operating an engine system of a vehicle, comprising:
   determining operating conditions of an engine;
   directing engine exhaust from an engine through an exhaust pipe downward to an underbody plane of the vehicle in response to the operating conditions of the engine, the exhaust pipe being coupled to a turbine of a turbocharger and a low-pressure exhaust gas recirculation (LP-EGR) pipe;

changing flow direction of the engine exhaust in the exhaust pipe between 90 degrees and 270 degrees within the underbody plane at a turning point upstream of an inlet of the LP-EGR pipe;

drawing exhaust gas from the exhaust pipe into the LP-EGR pipe upstream of the turning point;

recirculating the exhaust gas in the LP-EGR pipe to an intake system; and exhausting remaining engine exhaust from the exhaust pipe to a tailpipe upstream of a front tire axis of the vehicle.

2. The method of claim 1, further comprising compressing intake air via a turbocharger comprising a compressor coupled to a turbine in the exhaust system.

3. The method of claim 2, wherein exhaust gas enters the LP-EGR pipe downstream of the turbine and enters the intake system upstream of the compressor.

4. The method of claim 1, further comprising directing exhaust through a muffler and out of the tailpipe upstream of the front tire axis.

5. The method of claim 1, further comprising cooling recirculated exhaust gas within the LP-EGR pipe via an EGR cooler.

6. The method of claim 1, wherein increasing exhaust air flow is achieved by an additional back pressure valve within the exhaust system.

7. A vehicle, comprising:
an engine;
an exhaust pipe fluidically coupled to the engine and directing engine exhaust toward a vehicle rear along an underbody, the exhaust pipe bending around between front tires and rear tires back toward a vehicle front at a location between front tires and rear tires of the vehicle; and
a LP-EGR pipe coupled between the exhaust pipe downstream of a turbine of a turbocharger and an engine intake pipe at a location forward of the engine.

8. The vehicle of claim 7 further comprising a muffler positioned forward of the front tires.

9. The vehicle of claim 8 wherein the exhaust pipe first bends toward a central axis of the vehicle downstream of the turbine of the turbocharger, and then bends away from the central axis of the vehicle, more than 120 degrees, and then further bends back toward the central axis forward of the engine, leading toward the vehicle front and into the muffler.

10. The vehicle of claim 9 wherein the engine is a V-engine.

11. The vehicle of claim 10 further comprising a cooler in the LP-EGR pipe.

12. A system, comprising:
a low-pressure exhaust gas recirculation (LP-EGR) system including a LP-EGR pipe that couples an exhaust system downstream of a turbocharger turbine to an intake system, the LP-EGR pipe including an LP-EGR exhaust inlet;
an exhaust pipe coupled to the turbine and the LP-EGR exhaust inlet and
having a turn with an angle greater than 90 degrees and less than 270 degrees, the turn positioned between front and rear tires and upstream of the LP-EGR exhaust inlet; and
a muffler positioned in the exhaust system downstream of the LP-EGR exhaust inlet and forward of the front tires.

13. The system of claim 12, further comprising an engine positioned between the front and rear tires.

14. The system of claim 13, wherein the engine is positioned between the turn and the front tires, and the LP-EGR pipe further including an LP-EGR intake outlet, wherein the LP-EGR intake outlet is positioned rearward of the muffler.

15. The system of claim 14, wherein a tailpipe outlet is positioned forward of the front tires, and wherein a direction of the tailpipe outlet is oriented in a downward direction in front of the front tires.

16. The system of claim 14, further comprising a high-pressure EGR (HP-EGR) system including a HP-EGR pipe coupling the exhaust system upstream of the turbine to the intake system.

17. The system of claim 13, wherein the exhaust pipe includes a catalytic converter upstream of the turn, the catalytic converter positioned forward of the turn.

18. The system of claim 12, further comprising one or more exhaust gas coolers within the LP-EGR system.

19. The system of claim 12, wherein the turbocharger includes a compressor and the LP-EGR pipe is coupled to the intake system upstream, downstream, or both upstream and downstream of the compressor.

* * * * *